No. 872,618. PATENTED DEC. 3, 1907.
L. G. GEBHARD.
MEANS FOR VENTILATING TUNNELS.
APPLICATION FILED MAR. 27, 1906.
5 SHEETS—SHEET 1.
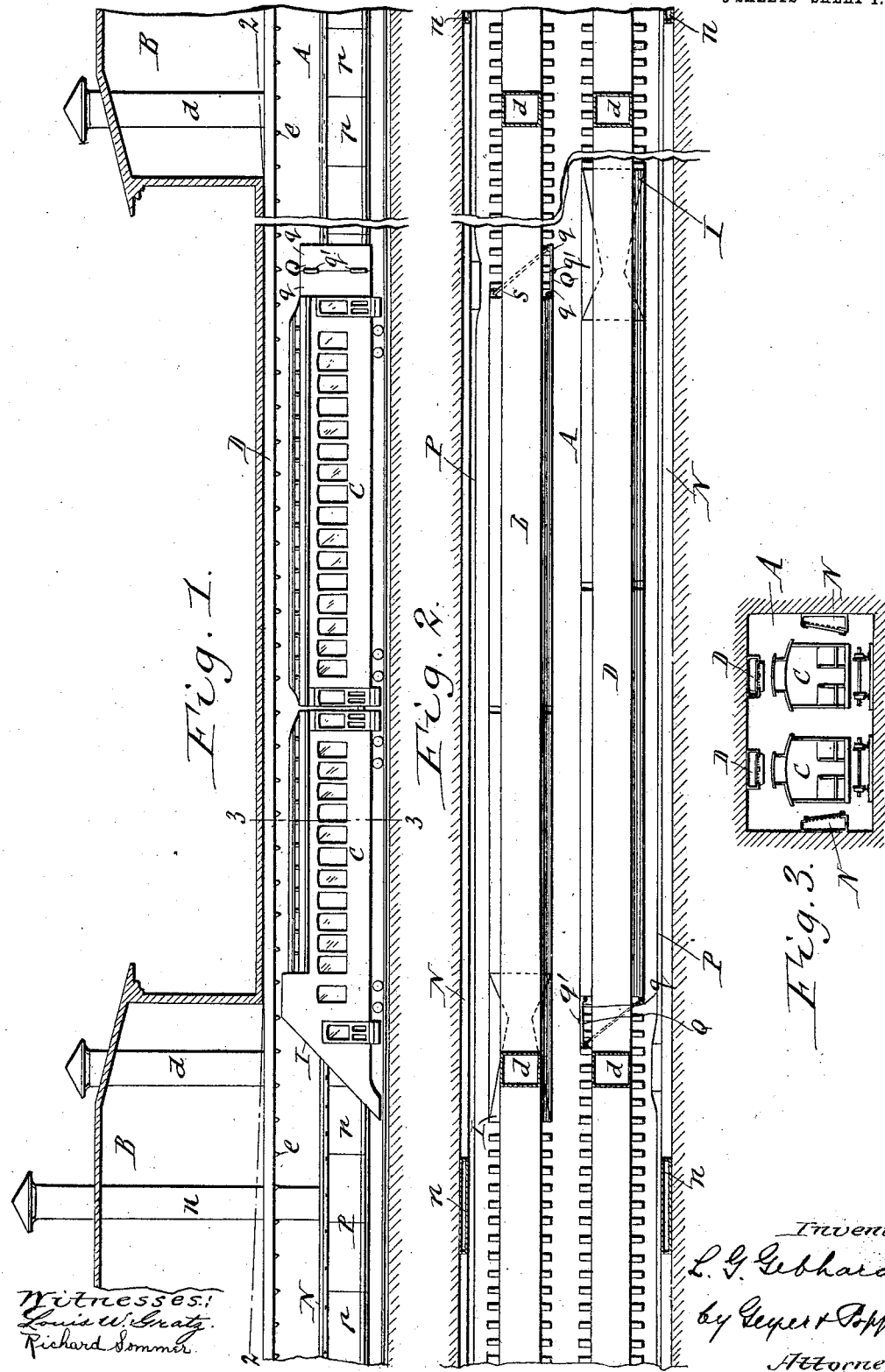

No. 872,618. PATENTED DEC. 3, 1907.
L. G. GEBHARD.
MEANS FOR VENTILATING TUNNELS.
APPLICATION FILED MAR. 27, 1906.
5 SHEETS—SHEET 2.
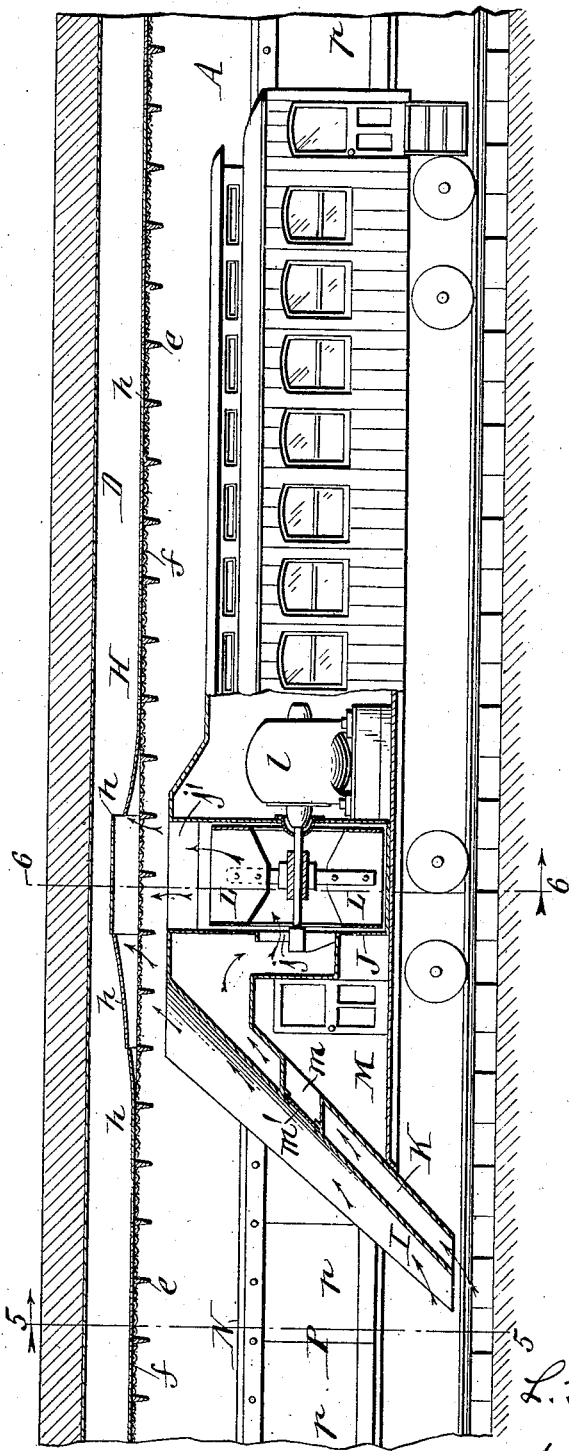

No. 872,618. PATENTED DEC. 3, 1907.
L. G. GEBHARD.
MEANS FOR VENTILATING TUNNELS.
APPLICATION FILED MAR. 27, 1906.
5 SHEETS—SHEET 3.
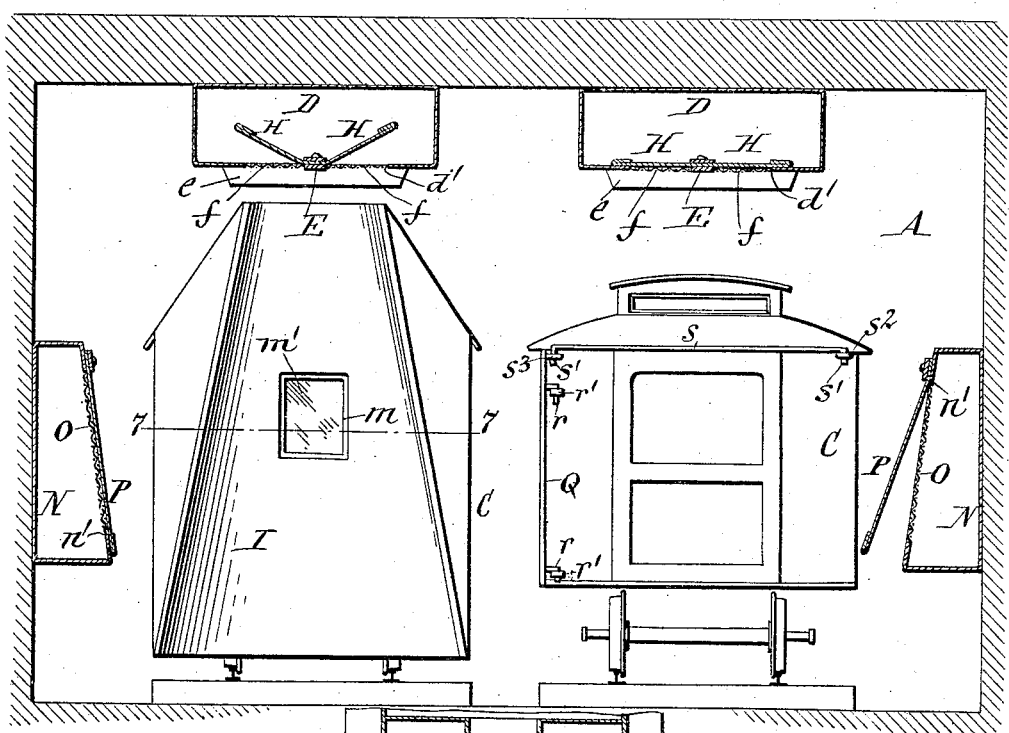

No. 872,618.
PATENTED DEC. 3, 1907.
L. G. GEBHARD.
MEANS FOR VENTILATING TUNNELS.
APPLICATION FILED MAR. 27, 1906.
5 SHEETS—SHEET 4.
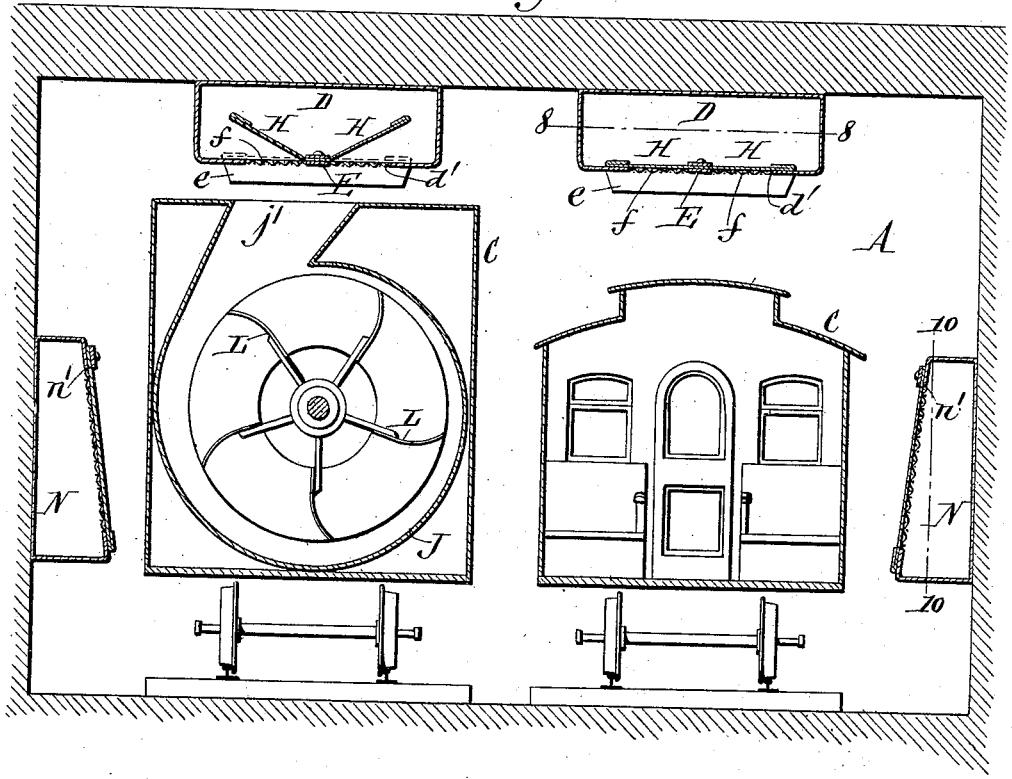
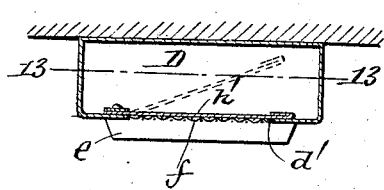
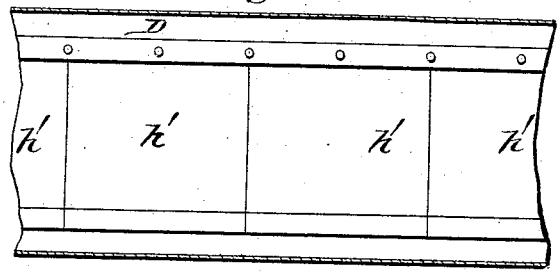

No. 872,618. PATENTED DEC. 3, 1907.
L. G. GEBHARD.
MEANS FOR VENTILATING TUNNELS.
APPLICATION FILED MAR. 27, 1906.

5 SHEETS—SHEET 5.

Witnesses:
Louis M. Gratz
Richard Sommer

L. G. Gebhard, Inventor
by Geyer & Popp,
Attorneys

UNITED STATES PATENT OFFICE.

LAWRENCE G. GEBHARD, OF BUFFALO, NEW YORK.

MEANS FOR VENTILATING TUNNELS.

No. 872,618.          Specification of Letters Patent.          Patented Dec. 3, 1907.

Application filed March 27, 1906. Serial No. 308,216.

*To all whom it may concern:*

Be it known that I, LAWRENCE G. GEBHARD, a citizen of the United States, residing at Buffalo, in the county of Erie and State of New York, have invented a new and useful Improvement in Means for Ventilating Tunnels, &c., of which the following is a specification.

This invention relates to means for ventilating under ground tunnels, subways or other conduits in which the air is liable to become foul or hot and unhealthy or uncomfortable for persons passing through the same.

Figure 8:
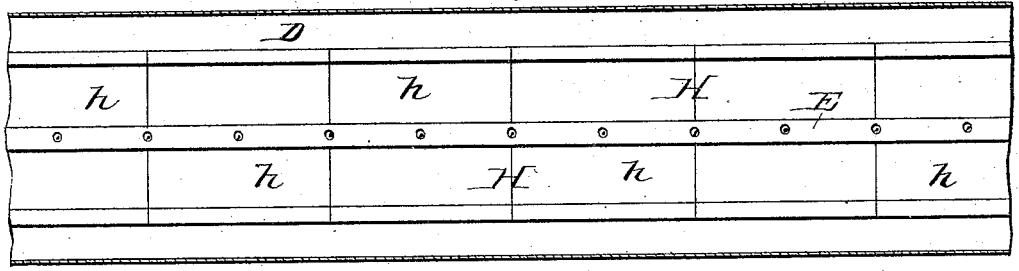
Figure 9:
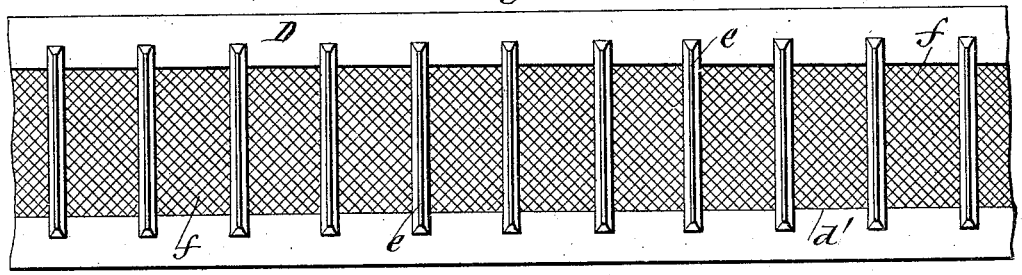
Figure 11:
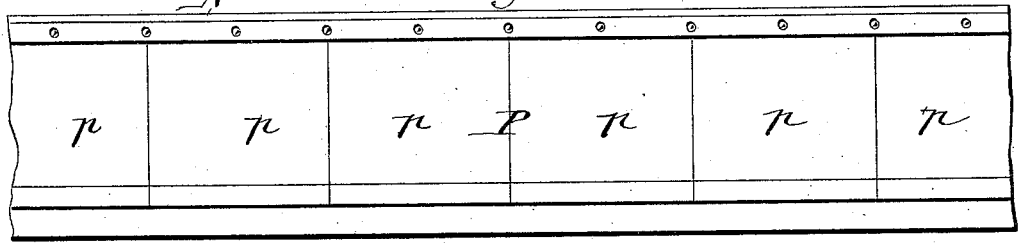
Figure 10:
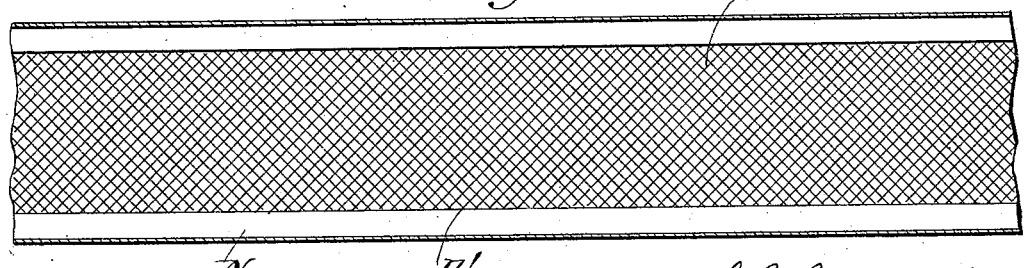

In the accompanying drawings consisting of 5 sheets: Figure 1 represents a vertical longitudinal section of an underground tunnel or subway for passenger trains equipped with my improved means for ventilation. Fig. 2 is a horizontal section of the same taken in line 2—2, Fig. 1. Fig. 3 is a cross section thereof in line 3—3, Fig. 1. Fig. 4 is a vertical section, on an enlarged scale, taken lengthwise through the tunnel or subway and the first car or front end of the train which carries part of my improved ventilating apparatus. Figs. 5 and 6 are vertical cross sections in the correspondingly numbered lines in Fig. 4. Fig. 7 is a fragmentary horizontal section in line 7—7, Fig. 5. Fig. 8 is a horizontal section of the air outlet conduit taken in line 8—8, Fig. 6. Fig. 9 is a bottom plan view of the same. Fig. 10 is a fragmentary vertical section of the air inlet conduit taken in line 10—10, Fig. 6. Fig. 11 is a side elevation of the same. Fig. 12 is a vertical cross section showing a slightly modified construction of the air outlet conduit. Fig. 13 is a horizontal section of the same in line 13—13, Fig. 12.

My improved ventilating system is applicable to all kinds of tunnels, subways, or conduits running horizontally or vertically above ground or under ground such as the subways in large cities, the tunnels extending under rivers, the vertical and horizontal shafts of mines, in which the normal or natural supply of fresh air is deficient and artificial replenishment is necessary.

The drawings represent the preferred embodiment of my invention as applied to an under ground passageway, tunnel or subway and the cars or train running through the same for the transportation of passengers such as are used in the congested parts of large cities.

A represents the horizontal tunnel or subway which may be of any suitable construction, B—B the stations or depots which are arranged at suitable intervals and through which the passengers enter and leave the tunnel and C, C the cars or train which runs upon a railway in the tunnel. These cars may be propelled by a motor operated by compressed air, steam, electricity, gas or in any other suitable manner.

D represents an outlet or pipe for the foul or impure air which may be arranged lengthwise in any suitable part of the tunnel but preferably along the roof or top thereof, as shown. At suitable intervals this outlet pipe or conduit is connected with the external atmosphere by upright branch outlet pipes or conduits $d$. This air outlet conduit is located over the path of the cars and is provided with a continuous air outlet slot or elongated opening $d^1$ which is arranged lengthwise of the outlet conduit and preferably on the underside thereof. Means are provided for controlling said outlet opening and enabling different parts thereof to be successively uncovered for establishing communication between different parts of the tunnel and the outlet conduit and withdrawing the air therefrom. The preferred means for this purpose, best shown in Figs. 5, 6 8 and 9 are constructed as follows: E represents a supporting bar arranged lengthwise in the central part of the outlet opening of the air outlet conduit and dividing the latter into two parts which are arranged on opposite sides of said bar. This central longitudinal bar may be supported in any suitable manner preferably by means of a plurality of cross bars $e$ arranged at intervals and comparatively short distances apart and each secured with its central part to the underside of the longitudinal bar E while its ends are secured to the underside of the outlet conduit on opposite sides of its outlet opening. The spaces in the air outlet opening between the longitudinal and cross bars are bridged by screens $f$ which are secured to said bars and the outlet conduit. As shown in the drawings these screens are constructed of woven wire but any other open work material such as perforated sheet metal will answer the purpose. Within the air outlet are arranged two parallel longitudinal shutters or valves H, H which serve as a closure for its air outlet opening. Each of these shutters preferably consist of a longitudinal series of sections $h$ of canvas or other flexible material which are arranged side by side and form practically a continuous piece. These sections are preferably secured at their inner edges to the longitudinal central bar of the air outlet conduit and normally rest loosely at their outer edges upon the outlet conduit at the outer edges of the opening thereof in which position the intermediate part of the sections rest upon the screens below the same and form a closure which cuts off communication between the interior of the tunnel and the air outlet conduit.

Although the sections of the flexible valve or shutter may be of various lengths the same have been shown in the drawings equal in length to two spaces between adjacent cross bars $e$. The transverse meeting edges between the adjacent shutter sections are preferably located over cross bars, as shown so that when the shutters are closed their transverse edges are firmly and reliably supported and form a tight joint which forms an effectual closure against the passage of air through the air outlet opening at this time.

Instead of employing two longitudinal rows of shutter sections side by side, as shown in Figs. 5, 6, 8 and 9, a single row of such shutter sections $h^1$ may be employed, as shown in Figs. 12 and 13. In this last mentioned construction the shutter sections are attached at one of their longitudinal edges to the outlet conduit on one side of the outlet opening while the other longitudinal edges are movable toward and from the outlet conduit at the opposite edge of said opening. Although the construction containing but a single row of shutter sections comes within my invention I prefer the construction containing two rows of shutter sections inasmuch as this produces a better distribution and flow of air into and through the outlet conduit.

Various means may be employed for taking the air from the interior of the tunnel and forcing the same past the shutter and into the outlet conduit at different points in the tunnel. The means shown in the drawings as an example are suitable for this purpose and are constructed as follows: I represents a scoop or deflector which inclines or rises from its lower front end to its elevated rear end and is preferably trough shaped in cross section, as shown in Figs. 5 and 7. This deflector is preferably mounted on the front end of a car which may be the first of a train and extends from a point close to the bottom of the tunnel to a point close to the underside of the outlet conduit, whereby the air during the forward movement of the deflector and car is lifted by the deflector from the lower part of the tunnel and forced upwardly past the outlet shutters and into the outlet conduit. As the car advances the different parts or sections of the outlet shutters are lifted successively into their open position by the blast of the air which is directed against the same but those portions or sections of the shutters in front and in rear of this blast remain in a closed position, thereby uncovering only part of said outlet opening at a time for the discharge of air from the tunnel but retaining all other parts of the shutters which are not exposed to the blast in a closed position so as to form a practically air tight conduit which conducts the impure air to the external atmosphere. By making the deflector trough shaped in the direction of its length it obtains better control of the air and aids the same in directing the air with greater force toward the outlet opening of the conduit.

In addition to the inclined scoop or deflector a power operated air ejecting or expelling device is employed which preferably consists of a fan having its case J mounted on the first car. The inlet eye $j$ of the fan case is connected with the rear end of a suction pipe K which is arranged in rear of the deflector and terminates at its front or inlet end close to the bottom of the tunnel, as shown in Fig. 4. The outlet or blast spout $j^1$ of the fan case projects upwardly toward the outlet opening of the outlet conduit. The rotary blades or wings L of the fan are represented in the drawings as being driven by an electric motor $l$ which is the most economical means if the car is electrically propelled but if the car is operated by other means, such as a steam, gas or air motor, a corresponding type of motor may be employed for operating the fan. As the car advances the impure air at the bottom of the tunnel is drawn into the lower end of the suction pipe K and conducted by the latter into the eye of the fan case from which it is expelled by the rotating blades or wings through the blast spout. Upon issuing from the blast spout the air strikes the shutter sections immediately above, thereby lifting the same and expelling the foul air into the outlet conduit. As the foul air which is usually heaviest and gathers at the bottom or lower part of the tunnel is thus successively drawn from all parts thereof and delivered by the fan into the outlet conduit the shutter sections of which are successively opened by the blast of the fan and admit the air in substantially the same manner in which this is effected by the blast produced by the deflector. All of the sections of the outlet shutter are successively lifted in this manner by the blast from the deflector or fan or both on the passing train or car and fall back again into their normal closed position after the car or train has passed.

When the car or train is running very fast only the deflector need be used as the same produces a sufficient movement or displacement of the air to effect the desired ventilation. But when the car or train is traveling slowly and the effect of the inclined deflector is materially reduced then the power driven fan is operated for forcibly withdrawing the air from the tunnel and expelling the same through the outlet conduit. When there is considerable traffic in the tunnel and the air becomes rapidly vitiated it is desirable to operate the fan and deflector at the same time so as to obtain the combined effect of the fan and the deflector and insure a thorough removal of the bad air. By the use of a power driven fan the air may also be expelled from the tunnel while the car or train is standing still.

While the air is being forced upwardly against a part of the outlet shutters, and the same is opened thereby for admitting the air into the outlet conduit, the air after reaching the inside of this conduit exerts an outward pressure against the closed sections of the shutters and assists in holding these shutter sections in a closed position, thereby reducing leakage of air to a minimum. By employing screens in the outlet openings of the outlet conduit the shutters are supported and prevented from being displaced outwardly by the internal air pressure in the outlet conduit.

The cross bars which support the longitudinal shutter bar or rail E are preferably extended downwardly a considerable distance and provided with a comparatively sharp lower edge. These cross bars thus serve as baffles which prevent spreading of the air blast from the deflector and fan and causes the same to be concentrated upwardly against the shutter sections immediately above the same, whereby the shutter sections are lifted and opened more positively and reliably for the admission of air into the outlet conduit.

The cab M of the motorman is preferably arranged on the first car between the suction pipe K and the fan case, as shown in Fig. 4, and to permit of looking forward over the road bed a sighting tube or window frame $m$ is set in an opening arranged centrally in the suction pipe and the air deflector. In order to avoid any material interruption in the direction of the air at this tube or frame a transparent pane $m^1$ is set therein at the same angle as the deflector and substantially flush therewith so as to form practically a continuation thereof.

As the foul air is expelled from the tunnel fresh air from the external atmosphere is forcibly introduced into the tunnel by means which are constructed as follows: N represents an air inlet pipe or conduit which is preferably arranged lengthwise adjacent to one of the side walls and nearer the bottom of the tunnel. At suitable intervals this inlet pipe or conduit is connected with the external atmosphere by upright branch pipes $n$. On the inner side of this inlet pipe the same is provided with a longitudinal air inlet opening, slot or passage way $n^1$ which extends continuously from end to end of the inlet conduit. This inlet opening is preferably covered by a screen O made of woven wire or similar open work material. Normally the air inlet opening is closed by a valve or shutter P which preferably consists of a longitudinal series of sections $p$ constructed of canvas or other flexible material. These sections are secured at their upper edges to the inner side of the inlet conduit above the inlet opening thereof and rest at their lower edges loosely against the inlet conduit below the inlet opening thereof while the intermediate parts thereof rest against the exterior of the screen and form a closure for said opening. The several sections abut or fit closely against each other at their opposing transverse edges so as to form practically a continuous piece.

The inner side of the conduit together with its screen and shutter are preferably inclined so that the top or upper part is nearer to the side wall of the tunnel than the lower part thereof, whereby the shutter sections are permitted to close more securely by gravity.

The relation of the inlet pipe or conduit to the railway is such that the cars move lengthwise quite close to the side of the air inlet conduit. This causes the suction which is produced by the car or train in moving forward to lift the inlet shutter sections successively away from the opening of the inlet conduit and draw fresh air from the same into the tunnel. This lifting of the shutters keeps pace with the forward movement of the car so that only a portion at a time of the inlet shutter is opened for the admission of air while the remaining parts thereof are closed and form practically an air tight closure and insure a reliable supply of fresh air from the exterior. By providing the inlet opening of the inlet conduit with a screen the latter forms a support for the inlet shutter sections and prevents the same from being displaced inwardly by the external air pressure against the inlet shutter.

It will be observed that only those sections of the inlet shutter adjacent to the rear end of the car or the rear end of the last car in a train are opened by reason of the suction produced during the forward movement of the car or train. The remaining sections of the inlet shutter are drawn tightly against their seats by the internal suction or external air pressure resulting from the withdrawal of the air through the open portion of the inlet opening.

In order to increase the lifting effect of the car or train upon the inlet shutter sections the rear end of the same is provided on that side farthest from the air inlet conduit with a rearward extension, or baffle plate or wall Q which causes the near side of the car to have its rear end terminate somewhat in advance of the corresponding end of its far side. The effect of this baffle wall is that the suction effect on the near side of the car will precede that on the far side thereof, thus preventing the air from following uniformly in behind the rear end of the car or train from all parts of the surrounding air space and insuring an increased suction effect upon the inlet shutter so as to open the same reliably and positively withdraw fresh air from the inlet conduit. All the sections of the inlet shutter are successively opened in this manner by the suction of the car and after the same has passed a given point the adjacent inlet shutter sections again drop into their normal closed position. The baffle wall is preferably constructed in sections and detachably connected with the car so as to permit of folding the same and conveniently removing it from one car to another. For this purpose the sections $q$, $q$ are connected by hinges $q^1$ and the front section is provided with hooks $r$ engaging with eyes $r^1$ on the car as shown in Fig. 5. The sections are held in their unfolded or operative position while in use by means of an inclined brace $s$ provided at its opposite ends with hooks $s^1$, $s^1$ engaging with eyes $s^2$, $s^3$ on the rear end of the car or train and the rear section of the baffle wall, as shown in Figs. 2 and 5. Although the branch pipes of the air inlet and outlet conduits may extend to the external atmosphere at any suitable place it is preferable to locate them at the passenger stations where they are not so conspicuous but accessible in case of repairs and not liable to interference.

By means of my improved ventilating apparatus it is possible to maintain the air in tunnels and like places as fresh and healthful as in the outer atmosphere, thereby avoiding the possibility of impairing the health of persons who are transported in places which are insufficiently ventilated in the natural way.

I claim as my invention:—

1. Means for ventilating tunnels and the like, comprising an air outlet conduit arranged lengthwise at the top of the tunnel and having an elongated outlet opening in its underside, baffle bars arranged at intervals across said outlet opening, and a valve or shutter arranged within the outlet conduit and adapted to cover and uncover said opening, substantially as set forth.

2. Means for ventilating tunnels and the like, comprising an air outlet conduit arranged lengthwise at the top of the tunnel and having an elongated outlet opening in its underside, a longitudinal supporting bar arranged centrally in said outlet opening, baffle bars arranged at intervals across said outlet opening and each secured at its ends to said conduit while its central part supports said longitudinal bar, and a valve or shutter for covering or uncovering said opening consisting of a plurality of shutter sections arranged in two parallel rows over said outlet opening and having their inner opposing ends secured to said supporting bar while their outer ends rest loosely on the bottom of said conduit, substantially as set forth.

3. Means for ventilating tunnels and the like, comprising an air inlet conduit arranged lengthwise in the tunnel and having a continuous inlet opening, a screen arranged across said opening, and a flexible valve or shutter for covering or uncovering said opening adapted to rest against the outer side of said screen, substantially as set forth.

4. Means for ventilating tunnels and the like, comprising an air inlet conduit arranged at the side of the tunnel and having an elongated air inlet opening on its inner side, and a valve or shutter for covering or uncovering said opening consisting of a longitudinal series of sections which are secured to said conduit above its inlet opening and rest loosely at their lower ends against the conduit below said opening, the inner side of said conduit and the valve or shutter coöperating with the opening therein being inclined, substantially as set forth.

5. Means for ventilating tunnels and the like, comprising an air outlet conduit having an elongated outlet opening, a valve or shutter which covers said opening and which may be shifted for successively uncovering different parts of said opening, and an air expelling device operating to force the air from the tunnel past said shutter and into said conduit, substantially as set forth.

6. Means for ventilating tunnels and the like, comprising an air outlet conduit having an elongated outlet opening, a valve or shutter which covers said opening and which may be shifted for successively uncovering different parts of said opening, and an air expelling device operating to force the air from the tunnel past said shutter and into said conduit and having a deflector movable through the tunnel and inclining from its front end rearwardly toward said outlet opening of the conduit, substantially as set forth.

7. Means for ventilating tunnels and the like, comprising an air outlet conduit having an elongated outlet opening, a valve or shutter which covers said opening and which may be shifted for successively uncovering different parts of said opening, and an air expelling device operating to force the air from the tunnel past said shutter and into said conduit and consisting of a car movable through the tunnel and carrying a deflector which inclines from its front end rearwardly toward said outlet opening of the conduit, substantially as set forth.

8. Means for ventilating tunnels and the like, comprising an air outlet conduit having an elongated outlet opening, a valve or shutter which covers said opening and which may be shifted for successively uncovering different parts of said opening, and an air expelling device operating to force the air from the tunnel past said shutter and into said conduit and consisting of a car movable through the tunnel and carrying a deflector which inclines from its front end rearwardly toward said outlet opening of the conduit and is trough shaped in the direction of its length, substantially as set forth.

9. Means for ventilating tunnels and the like, comprising an air outlet conduit arranged lengthwise at the top of the tunnel and having an elongated outlet opening in its underside, a valve or shutter which covers said opening and which is adapted to have its different parts successively shifted into an uncovering position by air pressure, and an air expelling device consisting of a deflector inclined from its lower front end upwardly and rearwardly to the opening of the outlet conduit, and a car movable lengthwise through the tunnel and carrying the deflector at its front end, substantially as set forth.

10. Means for ventilating tunnels and the like, comprising an air outlet conduit having an elongated outlet opening, a valve or shutter which covers said opening and which may be shifted for successively uncovering different parts of said opening, and an exhaust fan movable lengthwise through the tunnel and having its inlet communicating with the air space in the tunnel while its outlet is directed toward the opening of said outlet conduit, substantially as set forth.

11. Means for ventilating tunnels and the like, comprising an air outlet conduit having an elongated outlet opening, a valve or shutter which covers said opening and which may be shifted for successively uncovering different parts of said opening, an exhaust fan having its inlet communicating with the air space in the tunnel while its outlet is directed toward the opening of said outlet conduit, and a car movable lengthwise through the tunnel and carrying said fan, substantially as set forth.

12. Means for ventilating tunnels and the like, comprising an air outlet conduit having an elongated outlet opening, a valve or shutter which covers said opening and which may be shifted for successively uncovering different parts of said opening, an exhaust fan having its inlet communicating with the air space in the tunnel while its outlet is directed toward the opening of said outlet conduit, a car movable lengthwise through the tunnel and carrying said fan, and a motor mounted on the car for operating said fan, substantially as set forth.

13. Means for ventilating tunnels and the like, comprising an air outlet conduit arranged lengthwise at the top of the tunnel and having an elongated outlet opening in its underside, a valve or shutter which covers said opening and which is adapted to have its different parts successively shifted into an uncovering position by air pressure, a fan having its inlet communicating with the air space in the tunnel while its outlet is directed upwardly toward the opening of the outlet conduit, and a car movable lengthwise through the tunnel and carrying said fan, substantially as set forth.

14. Means for ventilating tunnels and the like, comprising an air outlet conduit arranged lengthwise at the top of the tunnel and having an elongated outlet opening in its underside, a valve or shutter which covers said opening and which is adapted to have its different parts successively shifted into an uncovering position by air pressure, a deflector inclined from its front end upwardly and rearwardly to the outlet opening of said air conduit, a car movable lengthwise through said tunnel and supporting said deflector, and a window arranged in said deflector, substantially as set forth.

15. Means for ventilating tunnels and the like, comprising an air outlet conduit arranged lengthwise at the top of the tunnel and having an elongated outlet opening in its underside, a valve or shutter which covers said opening and which is adapted to have its different parts successively shifted into an uncovering position by air pressure, a deflector inclined from its front end upwardly and rearwardly to the outlet opening of said air conduit, a car movable lengthwise through said tunnel and supporting said deflector, and a window arranged in said deflector and having a transparent pane arranged at the same angle as the deflector, substantially as set forth.

16. Means for ventilating tunnels and the like, comprising an air outlet conduit arranged lengthwise at the top of the tunnel and having an elongated outlet opening in its underside, a valve or shutter which covers said opening and which is adapted to have its different parts successively shifted into an uncovering position, a deflector inclining from its front end rearwardly and upwardly to said outlet opening, a fan arranged in rear of the deflector and having its outlet directed toward the outlet opening of said conduit, and a car upon which said deflector and fan are mounted, substantially as set forth.

17. Means for ventilating tunnels and the like, comprising an air outlet conduit arranged lengthwise at the top of the tunnel and having an elongated outlet opening in its underside, a valve or shutter which covers said opening and which is adapted to have its different parts successively shifted into an uncovering position, a car movable lengthwise through the tunnel, a deflector mounted on the front end of the car and inclining from its front end upwardly and rearwardly to the outlet opening of said conduit, a fan mounted on said car and having its outlet spout directed toward the outlet opening of said conduit, and a suction pipe arranged in rear of said deflector and having its inlet located at the lower end of the deflector and its outlet connected with the eye of the fan, substantially as set forth.

18. Means for ventilating tunnels and the like, comprising an air outlet conduit arranged lengthwise at the top of the tunnel and having an elongated outlet opening in its underside, a valve or shutter which covers said opening and which is adapted to have its different parts successively shifted into an uncovering position, a car movable lengthwise through the tunnel, a deflector mounted on the front end of the car and inclining from its front end upwardly and rearwardly to the outlet opening of said conduit, a fan mounted on said car and having its outlet spout directed toward the outlet opening of said conduit, a suction pipe arranged in rear of said deflector and having its inlet located at the lower end of the deflector and its outlet connected with the eye of the fan, and a window arranged in the central part of said deflector and suction pipe, substantially as set forth.

19. Means for ventilating tunnels and the like, comprising an air inlet conduit arranged lengthwise at the side of the tunnel and having an elongated inlet opening at its inner side, a valve or shutter which covers said opening, a car or train adapted to move lengthwise in the tunnel close to said inlet conduit so as to lift said valve or shutter by suction from said opening, and a baffle arranged at the rear end of the car or train on the side far from said air inlet conduit, substantially as set forth.

20. Means for ventilating tunnels and the like, comprising an air inlet conduit arranged lengthwise at the side of the tunnel and having an elongated inlet opening at its inner side, a valve or shutter which covers said opening, a car or train adapted to move lengthwise in the tunnel close to said inlet conduit so as to lift said valve or shutter by suction from said opening, and a baffle arranged at the rear end of the car or train on the side far from said air inlet conduit and consisting of an upright and rearwardly extending board or plate, substantially as set forth.

21. Means for ventilating tunnels and the like, comprising an air inlet conduit arranged lengthwise at the side of the tunnel and having an elongated inlet opening at its inner side, a valve or shutter which covers said opening, a car or train adapted to move lengthwise in the tunnel close to said inlet conduit so as to lift said valve or shutter by suction from said opening, and a baffle arranged at the rear end of the car or train on the side far from said air inlet conduit and consisting of upright board or plate sections, hinges connecting the sections of the baffle, hooks arranged on the foremost section and engaging with eyes on the rear end of the car or train, and a brace having hooks at opposite ends which engage with eyes on the rear end of the car or train and the rearmost section of the baffle, substantially as set forth.

22. Means for ventilating tunnels and the like, comprising an air outlet conduit arranged lengthwise in the tunnel and having a continuous outlet opening, a continuous valve or shutter controlling said outlet opening, an air inlet conduit arranged lengthwise in the tunnel and having a continuous valve or shutter controlling said inlet opening, a car movable lengthwise through said tunnel and operating to open different parts of said inlet valve or shutter sucessively by suction, and an air forcing device mounted on said car and operating to open said outlet valve or shutter by an air blast, substantially as set forth.

23. Means for ventilating tunnels and the like, comprising an air outlet conduit arranged lengthwise at the top of the tunnel and communicating at intervals by branch pipes with the external atmosphere and having a continuous outlet opening in its underside, a continuous valve or shutter controlling said outlet opening, an air inlet conduit arranged lengthwise at the side of the tunnel and communicating by branch pipes with the external atmosphere and having a continuous inlet opening in its inner side, a continuous valve or shutter controlling said inlet opening, a car or train movable lengthwise through the tunnel close to said inlet conduit and operating to open the parts of its valve or shutter successively by suction, and an air expelling device mounted on the car or train and operating to force the air from the tunnel upwardly for opening said outlet valve or shutter by pressure and admitting the air into said outlet conduit, substantially as set forth.

Witness my hand this 24th day of March, 1906.

LAWRENCE G. GEBHARD.

Witnesses:
   THEO. L. POPP.
   RUTH TARBELL.